(12) United States Patent
Otway

(10) Patent No.: US 6,192,130 B1
(45) Date of Patent: Feb. 20, 2001

(54) INFORMATION SECURITY SUBSCRIBER TRUST AUTHORITY TRANSFER SYSTEM WITH PRIVATE KEY HISTORY TRANSFER

(75) Inventor: Josanne Otway, Ottawa (CA)

(73) Assignee: Entrust Technologies Limited, Ottawa (CA)

(*) Notice: Under 35 U.S.C. 154(b), the term of this patent shall be extended for 0 days.

(21) Appl. No.: 09/345,234

(22) Filed: Jun. 30, 1999

Related U.S. Application Data (63) Continuation of application No. 09/099,840, filed on Jun. 19, 1998.

(51) Int. Cl.[7] .................................................... H04L 9/00
(52) U.S. Cl. ............................. 380/277; 380/1; 380/286; 380/280; 705/76; 705/71; 705/66; 713/158; 713/157; 713/178
(58) Field of Search ........................... 380/1, 286, 277, 380/280; 705/76, 66, 77; 713/157, 158, 178

(56) References Cited

U.S. PATENT DOCUMENTS

| | | | |
|---|---|---|---|
| 4,227,253 | * 10/1980 | Ehrsam et al. | 380/45 |
| 4,941,176 | * 7/1990 | Matyas et al. | 380/280 |
| 5,721,777 | * 2/1998 | Blaze | 380/286 |
| 5,802,175 | * 9/1998 | Kara | 380/277 |
| 5,815,573 | * 9/1998 | Johnson et al. | 380/286 |
| 5,940,507 | * 8/1999 | Cane et al. | 713/165 |
| 5,991,406 | * 11/1999 | Lipner et al. | 380/286 |
| 6,044,155 | * 3/2000 | Thomlinson et al. | 713/155 |

OTHER PUBLICATIONS

SC Magazine, PKI Market Survey—UniCERT 3.0.5, Feb. 2000, SC Magazine.*
Baltimore Technologies, UniCERT Version 3.0 Product Overview, 1999, Baltimore Technologies, p. 19.*
Baltimore Technologies, UniCert Reviewer's Guide Version 3.0, 1999, Baltimore Technologies, p. 7.*
Netscape, Administrator's Guide—Netscape Certificate Mangement System—Version 4.1, 1999, Netscape, Chapter 25.*

\* cited by examiner

*Primary Examiner*—Tod Swann
*Assistant Examiner*—Ronald F. Sulpizio, Jr.
(74) *Attorney, Agent, or Firm*—Markison & Reckamp, P.C.

(57) ABSTRACT

A first trusted authority, such as an originating certification authority, that stores key history data, such as private decryption keys for one or more subscribers, includes a key history exportation engine operative to generate a security key history exportation packet. The security key history exportation packet contains at least encrypted security key history data uniquely associated with a subscriber. A second trusted authority, such as a destination certification authority, includes a security key history importation engine operative to decrypt the security key history exportation packet. The retrieved security key history data then is stored and made accessible through the second trust authority for later access by the subscriber. The second trusted authority serves as a new trust anchor instead of the first trust authority.

40 Claims, 6 Drawing Sheets

FIG. 5
export from orig CA

FIG. 6

INFORMATION SECURITY SUBSCRIBER TRUST AUTHORITY TRANSFER SYSTEM WITH PRIVATE KEY HISTORY TRANSFER

CROSS REFERENCE TO RELATED CO-PENDING APPLICATION

This application is related to a co-pending application entitled "A Public Key Cryptography Based Security System to Facilitate Secure Roaming of Users", filed on Jun. 19, 1998, having Ser. No. 09/099,840, inventor Van Oorschot, and owned by instant assignee.

FIELD OF THE INVENTION

The invention relates generally to systems employing cryptography based information security, and more particularly to systems employing public key encryption.

BACKGROUND OF THE INVENTION

Communication systems such as computer networks, telecommunication systems, and other systems are increasingly using cryptography to encrypt information sent electronically. With the increase in electronic commerce, electronic mail communication, and other information for which users may wish to keep secret, public key cryptography systems employ an encryption key pair, such as a decryption private key and an encryption public key to decrypt and encrypt data. The decryption private keys are secret keys that are protected by the use of encryption techniques and other techniques to help ensure that an attacker cannot readily obtain this critical key. In communications that employ many users, it is not uncommon that a given software application has its own encryption and decryption keys as well as the user of a computer.

Figure 1:
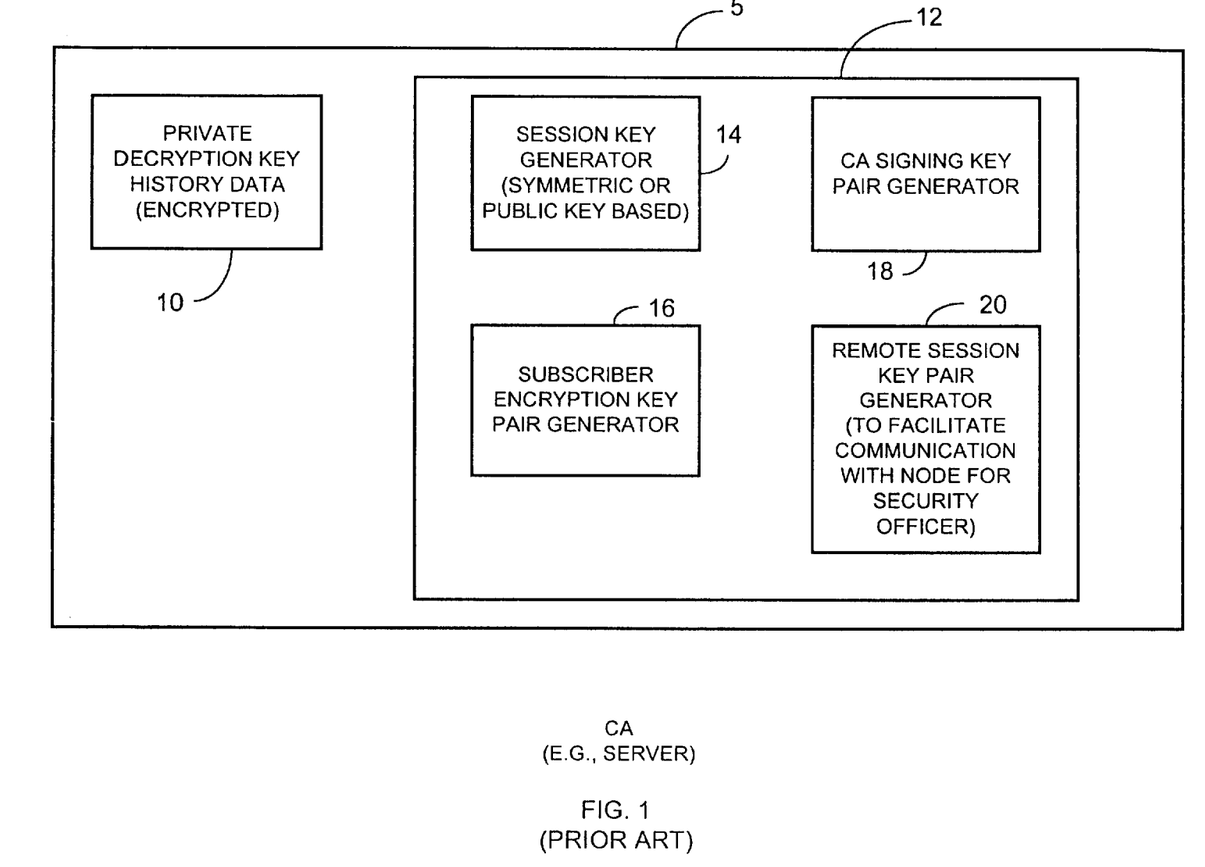
FIG. 1 is a block diagram illustrating one example of a prior art certification authority as known in the art.

Referring to FIG. 1, a trust authority, such as a certification authority in a public key infrastructure, maintains private encryption key history data 10 for one or more subscribers. The certification authority 5 serves as the originating trust authority (trust anchor for the subscriber). The cryptographic engine 12 includes a session key generator 14, a subscriber encryption key pair generator 16, a certification authority signing key pair generator 18, and a remote session key pair generator 20. As known, the key pairs that are generated may all generate from a common key pair generator algorithm if desired. In a public key based system, a subscriber sends a signed request using a private signing key to the originating certification authority 5 requesting a new encryption key pair using a session key generated from the session key generator 14. When transferring the encryption private key from the trust authority to the subscriber, the session key generator is used to create a session key to encrypt the private decryption key. If the subscriber request is password-based, the session key is based on the password which both the subscriber and trust authority know, and is generated independently by the subscriber and the trust authority. If the subscriber request is public key-based, the session key is a random key generated by the trust authority and is transferred to the subscriber encrypted with an existing public key for which the subscriber has the private decryption key in its local storage. The client requests a new encryption certificate and private decryption key. When a key such as a public encryption key expires, the certification authority 5 keeps the history of private encryption keys on a per user basis to allow the user to decrypt old messages. After a client sends the request, the certification authority 5 verifies the signature on the request and generates a new encryption key pair using the subscriber encryption key pair generator 16. The certification authority locally stores the private decryption keys as part of the key history for the subscriber. The certification authority 5 then generates an encryption certificate and sends a new certificate that is signed with the trust authority private signing key generated by the signing key pair generator 18. It encrypts this information using the session public key as known in the art (the private decryption key is encrypted with the session key). As part of the new certificate, a new decryption private key is also sent to the subscriber. The remote session key pair generator 20 generates session key pairs to facilitate secure communication with a subscriber, for example, to send other information to the trusted authority as known in the art.

Conventional public cryptography based security systems may store a user's decryption private key and other user-specific data, such as program settings or user preferences, in secure storage of a server. The storage of such user-specific data in a centralized location accommodates central generation and/or updating of data. This allows updates to be locally accessible to the user from various locations, and may serve as a master copy in case the local data storage or program employing such data is lost or upgraded. Each time a user (subscriber) accesses the server/directory with appropriate identification or access permission, the subscriber obtains access to its user-specific data. A problem with such systems, is that there is typically no history of previous decryption private keys so a subscriber cannot read older encrypted data. For example if a previous e-mail was encrypted using an older encryption key of the subscriber, and the encryption key was subsequently updated or replaced after a period of time, which is common, the e-mail cannot be read using the new decryption private key because it is no longer paired with the older public encryption key.

To overcome this problem, other public key cryptography based security systems store the history of decryption private keys locally in a user's computer memory units and protect this information (for example by encryption) to avoid access by an attacker. In addition, the history of the decryption private keys is stored in a master copy form in the security manager server. In such a system however, such backed-up decryption private keys are only accessible through the manager server and not directly to the user.

Upon loss of a previous decryption private key, which may be 1,024 or 2048 bits long (for example if the RSA algorithm is used), a subscriber or user identified as having the proper access for the community can be allowed to access the stored history data to obtain a previously lost decryption private key. A user may need to recover multiple keys, that is a key history, because the validity of certificates expires periodically, and thus over time users have a number of different key pairs. A new key pair is automatically generated either by the manager server or the user computer upon the expiration of the validity period of the certificates. In order for a user to obtain a copy of the key history from the manager server, the subscriber must prove through special procedures which provide access control, such as a manual telephone call or personal appearance or other mechanism to obtain a new password to gain access to the key history. Because access to the manager server key history is particularly sensitive, such procedures are typically designed to be inappropriate for frequent use, and therefore are inconvenient as a mechanism of regular access to the key history.

Also, a problem arises in moving a public key infrastructure user or other information security user from one originating trust authority (e.g., server) domain to another trust authority domain while preserving the subscriber's ability to decrypt old documents and verify previously signed files. Known systems do not generally provide a system coordinated facility for moving users from one trusted authority, such as a certification authority, to another. Information security systems that maintain decryption key histories or other cryptographic key histories, may have the capability to export decryption keys from a subscriber, such as a software application, network node, stand alone data processing unit or other entity. This may be done, for example, using PKCS #12 Standard protocol which is generally used to transfer private keys and certificates to allow other software applications, for example, in a common node to use private keys. However, such systems typically require the subscriber to export a single decryption key and another software program to import this single key. This becomes disadvantageous because it requires the subscriber to individually manage the process and typically there is no central backup of the users' decryption keys. In addition, the trust anchor or originating certification authority, is typically not changed.

Typically, subscribers are given a system identity and user specific data that is stored at a central server, such as a certification authority. A subscriber may need to be moved from one server to another, for example, if the subscriber changes positions to another part of a company managed by a different certification authority, or for operational load balancing reasons or due to corporate reorganizations, for example. Subscriber data, such as certificate renewal information, key recovery services and other services, should be managed by the destination certification authority to insure proper information security. The destination certification authority that serves as the new certification authority should be able to issue new certificates for the subscriber which reflect the new certification authority security policies. For example, these policies may include the required key length for encryption, the desired encryption algorithm and other information. However, as a subscriber in the new certification authority's domain, the subscriber may be unable to decrypt data encrypted prior to the move if it has lost continued access to its old decryption keys (the decryption key history data). The per user information of the new certification authority does not typically contain information from the user's "previous life" and in particular, the destination server does not typically have the full decryption key history of the subscriber. As such, the subscriber is unable to decrypt older messages encrypted under previous public keys that have since been updated.

Consequently, a need exists for a security information system to provide a more centralized storage of a backup copy of a user's cryptographic key, such as decryption key histories, after a transfer to a different trust authority so that the subscriber's trust anchor changes. A transfer should allow a transfer of a subscriber from one or more trust authorities and if desired, allow a user to move more than once or consolidate cryptographic services from multiple certification authorities to one authority. It would also be advantageous if a combination of a subscriber and certification authority or other entity automated the process to automatically provide a destination certification authority with a backup copy of the user's private decryption key histories.

DETAILED DESCRIPTION OF THE PREFERRED EMBODIMENT

Briefly, a first trusted authority, such as an originating certification authority, that stores key history data, such as private decryption keys for one or more subscribers, includes a key history exportation engine operative to generate a security key history exportation packet. The security key history exportation packet contains at least encrypted security key history data uniquely associated with a subscriber. A second trusted authority, such as a destination certification authority, includes a security key history importation engine operative to decrypt the security key history exportation packet. The retrieved security key history data then is stored and made accessible through the second trust authority for later access by the subscriber. The second trusted authority serves as a new trust anchor instead of the first trust authority and also includes a copy of the plurality of decryption keys, for example, so that when a subscriber is moved from one certification authority to another, a subscriber may gain access to old decryption keys to facilitate retrieval of earlier stored encrypted data that was encrypted using a prior encryption key pair set. The system is also applicable to symmetric key systems in addition to public key based systems.

It will be recognized that the disclosed system is also applicable to symmetric key based systems. However, for purposes of illustration, the disclosed systems and method will be described with respect to a public key based cryptography system.

Figure 2:
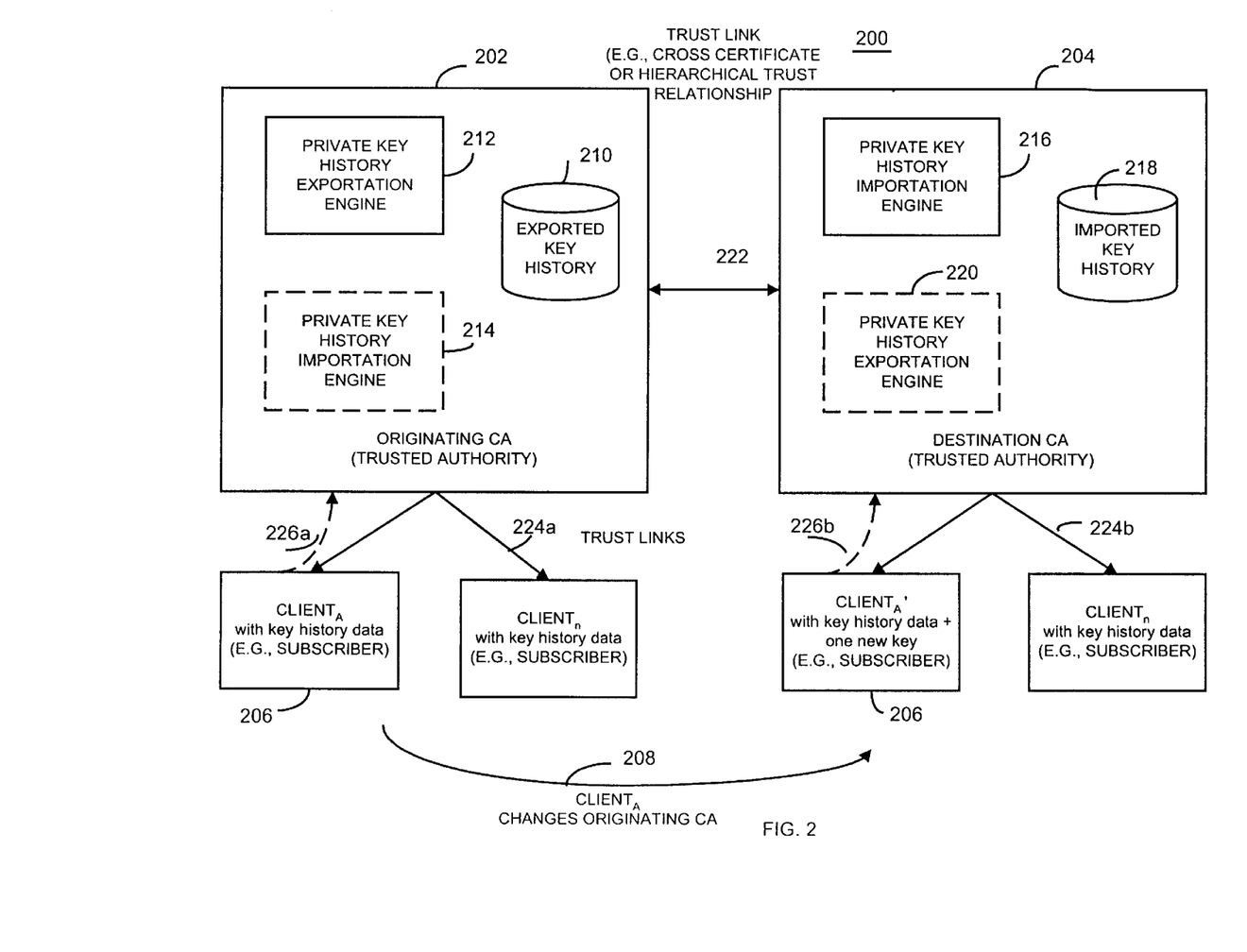
FIG. 2 is a block diagram of an information security system that facilitates subscriber trust authority transfer in accordance with one embodiment of the invention.

FIG. 2 shows an example of an information security system 200 having an originating trust authority 202, a destination certification authority 204, and a subscriber 206 which has the originating certification authority 202 as the trust authority. The subscriber 206 is then moved to a destination trust authority 204 shown by arrow 208. The originating trust authority 202 and the destination trust authority 204 may be, for example, a suitable computer server, or any other suitable processing device. The subscriber 206 may be, for example, a software application, network node, such as an IBM compatible PC, a portable communication unit, data processing unit, or any other suitable entity. The trust authority 202 stores subscriber key history, such as a plurality of private decryption keys associated with one or more subscribers in a storage medium 210. The storage medium 210 may be a secured storage medium and the key history data may be stored therein in an encrypted format. The trust authority 202 serving as an originating certification authority, if the system 200 is a public key based system, stores decryption private keys as the key history data. The certification authority 202 includes a private key history exportation engine 212 and optionally, if desired, a private key history importation engine 214. The originating trust authority 202 uses the private key history importation engine 214 to import private key histories, for example, private decryption keys from the destination authority 204.

The destination trust authority 204 includes a private key history importation engine 216 and an imported key history storage unit 218 that stores imported key history data for one or more subscribers. The originating trust authority 202 and the destination trust authority 204 may be cross certified or arranged in a strict heirarchy to trust each other as indicated by cross certification arrow 222, as known in the art. The trust authority 204 may also include, if desired, a private key history exportation engine 220 to export key history data to other certification authorities for subscribers that have the certification authority 204 as its originating certification authority, or trust anchor.

In this embodiment, the subscriber is transferred from the originating trust authority 202 to the destination authority 204 and as such the destination authority 204 serves as a trust certification authority for the subscriber instead of the trust authority 202. The destination trust authority 204 after importing the key history data that is exported from the originating certification authority 202 can then provide a decryption key, a plurality of old keys, the entire key history, or any suitable portion thereof from the imported key history data to the subscriber 206 in response to a request from the subscriber. Also as shown are trust links 224a and 224b, indicating that the respective subscribers use the associated certification authority as its trust anchor. Dashed arrows 226a, 226b represent communication links for submitting, for example, requests for old decryption keys. These links may be, for example, any suitable communication links including Internet based links, wireless links or any other suitable links and the communication may be performed under any suitable protocol including, for example, PKCS No. 12-based protocol or PKIX-CMP-based protocol, as known in the art.

Initially, the subscriber 206 having the originating trust authority 202 contains key history data such as a plurality of private decryption keys. A copy of the key history data is stored as export key history data in the export key history storage unit 210. The subscriber 206, after being transferred to the destination certification authority, will then store the key history data plus one new decryption key due to a new encryption key pair generated by the destination certification authority when the subscriber moves. It will be recognized that the creation of a new decryption key could be optional. The destination CA could make a certificate with the user's current public key that was imported from the originating CA so when they recovered the key history, the user would get a new certificate and their old decryption keys. As known in the art, the key history data by a given subscriber is transferred from a subscriber to the certification authorities for backup and the certification authorities do not use the decryption private keys.

Figure 3:
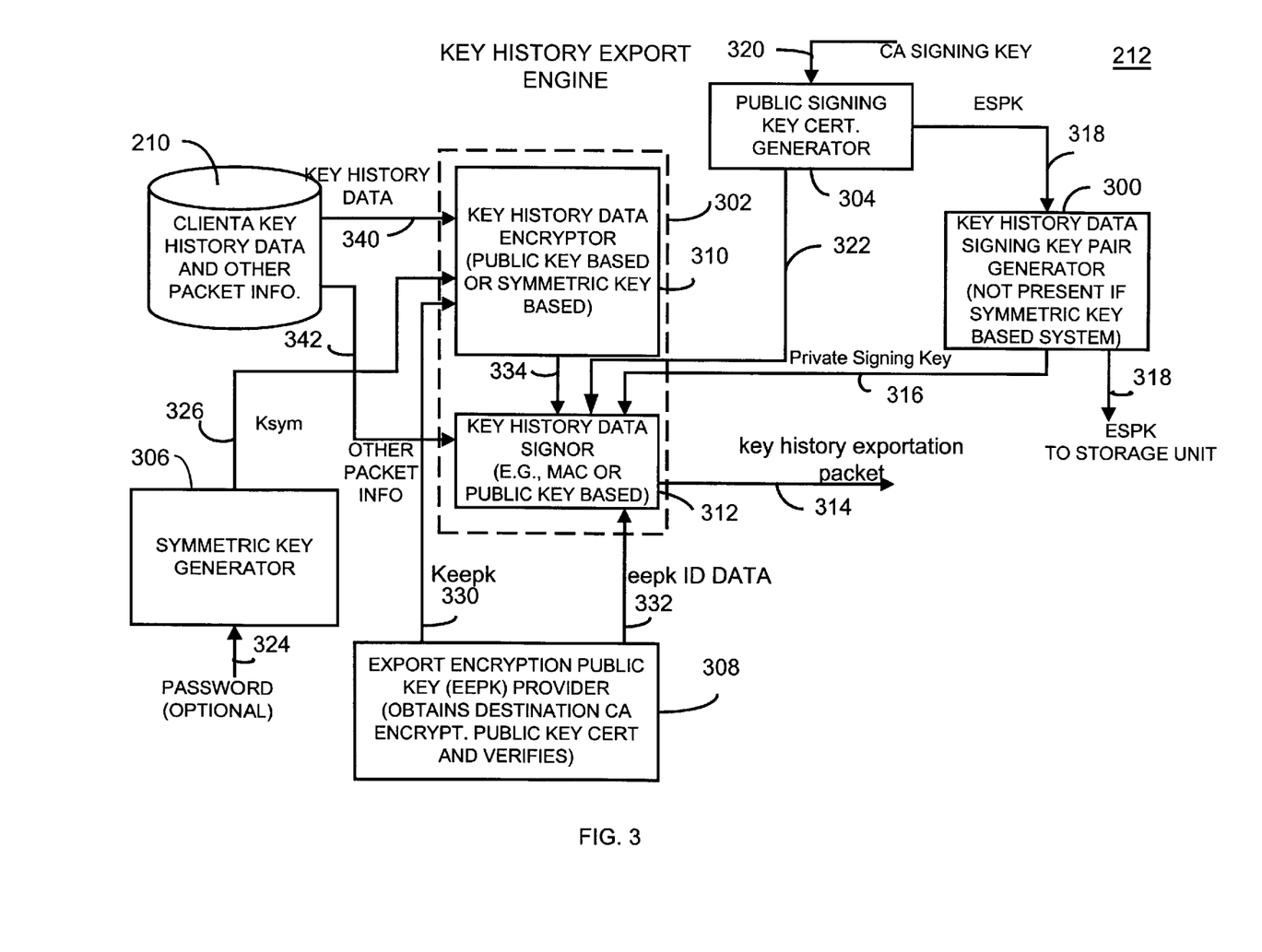
FIG. 3 is a block diagram illustrating one example of a key history exportation engine in accordance with one embodiment of the invention.

FIG. 3 illustrates one example of the key history exportation engine 212 having a key history data signing key pair generator 300 and a private key history exportation packet generator 302. Also if desired, the key history exportation engine 212 may include a public signing key certificate generator 304, a symmetric key generator 306 and an export encryption public key provider 308. The private key history exportation packet generator 302 includes a key history data encryptor 310 and a key history data signor 312. The private key history exportation packet generator 302 generates a security key history exportation packet 314 for the destination trust authority. The key history data signing key pair generator 300 generates an exportation signing key pair including a key history export private signing key 316 that is used to digitally sign the private key history exportation packet (and for signing key history data) and also generates a corresponding key history importation public verification key 318 which serves as an exportation signing public key that is used to verify the digital signature generated using the export private signing key 316. The key history importation public verification key 318 is then stored in a storage unit, such as storage medium 210 and is also used as input to a public signing key certificate generator 304. The public signing key certificate generator 304 performs conventional trusted authority certificate generation by generating a public key certificate containing the key history importation public verification key 318 and signing the certificate using the trusted authority's private signing key 320. Any suitable certificate generation algorithm may be used. In addition, any suitable public key pair generator, such as an RSA-based key pair generator or any other suitable system may be used as the key history data signing key pair generator 300. The public key certificate 322, referred to as the importation verification public key certificate, generated from the public signing key certificate generator 304 is then stored in the storage unit 210.

The symmetric key generator 306 may be a password-based symmetric key generator as known in the art that uses a password 324 and a password based key key generator to generate an exportation symmetric signing key 326 that serves as input to the key history data encryptor 310. The exportation symmetric signing key is used to encrypt the key history data.

The export encryption public key provider 308 may be any suitable software module that obtains an export encryption public key (EEPK) 330 that has been generated by an importation engine. This may be accomplished by obtaining a public key certificate generated by the destination authority containing the EEPK. The export encryption public key 330 is used as a public encryption key by the key history data encryptor 310. The export encryption public key provider 308 also obtains export encryption public key identification data 332, for example, from a public key certificate containing the export encryption public key 330. The export encryption public key identification data 332 includes, for example, data representing a unique ID for key pair (private decryption key and public encryption key) at the importing trust authority. The export encryption public key identification data 332 serves as input to the key history data signer 312. The key history data signer uses the export encryption public key to encrypt the private keys in the key history, the exportation encryption public key identification data is included with the signed data so that the importer knows which of their own export(ation) encryption public keys was used to encrypt the data. They importer has access to the matching private key which it will use to decrypt the data.

The private key history exportation packet generator 302 uses the key history data encryptor 310 (public key based or symmetric key based) to provide encrypted key history data 334 to the key history data signer 312 to form the key history exportation packet 314. The key history data encryptor 310 may be any suitable software module or cryptographic engine that utilizes public key encryption algorithms and, in this embodiment, symmetric key encryption algorithms as set forth below. The export encryption public key 330 is associated with the destination trust authority and is used to form encrypted key history data 334. The key history data encryptor uses known encryption techniques to encrypt a plurality of subscriber private decryption keys, namely the encryption key history data using the symmetric exportation encryption key 326. The symmetric exportation encryption key 326 is encrypted using the export encryption public key 330 that is associated with the destination trust authority to form encrypted key history exportation data 334. This methodology is used as the public key method when a password is not provided. If a password is not provided then the exportation encryption and signing key pairs and associated certificates do not generally exist. If a password is provided a symmetric key is created based on the password and is used to encrypt the key history. The symmetric key is not typically included in secured key history data as it can be derived at the importation server using the same password. The encrypted key history exportation data 334 is then digitally signed by key history data signer 312. The key history data signer digitally signs the encrypted key history data 334 using the export private signing key 316 generated by the key history data signing key pair generator 300. As such, the key history data 340, such as a plurality of private decryption keys associated with prior used public/private encryption key pairs for the subscriber, serve as input to the key history data encryptor 310. Hence, the importation verification public key certificate (322) contains the key history importation public verification key (318) and is given to the key history data signor to be included with the key history packet information. The exportation signing public key 318 is used by the importing CA to verify the signature on the key history exportation packet 314.

The key history data signer 312 performs the digital signature operations through known algorithms such as an RSA type signing algorithm, or any other suitable algorithm. Other key history exportation packet information 342 is retrieved from the storage unit 210 and serves as input to the key history data signer. The other key history packet information includes, for example, the algorithms (or data identifying them) used for encryption and signing.

The key history exportation packet 314 includes key history data, such as encrypted private encryption keys and matching certificates. The certificates are preferably not encrypted. The key history exportation packet may also include, for example, an identifier which tells the importer which public encryption key was used to encrypt the private key history, the importation verification public key certificate 322, the subscriber identification data and destination trust authority identification data. Preferably, the key history data, namely the encrypted plurality of keys, the identification data for the export encryption public key, the importation verification public key certificate, the client identification data and the destination trust authority identification data is signed using the export signing public key 318.

In summary, the private key history exportation packet generator encrypts the private key history data using a symmetric key 326, e.g., private keys in the history and includes other data to be signed as the key history exportation packet. The symmetric key 326 is encrypted with the encryption exportation public key 332 of the destination trust authority. The private key history exportation packet generator then signs this data using the exportation signing public key (ESPK) of the originating trust authority.

Figure 4:
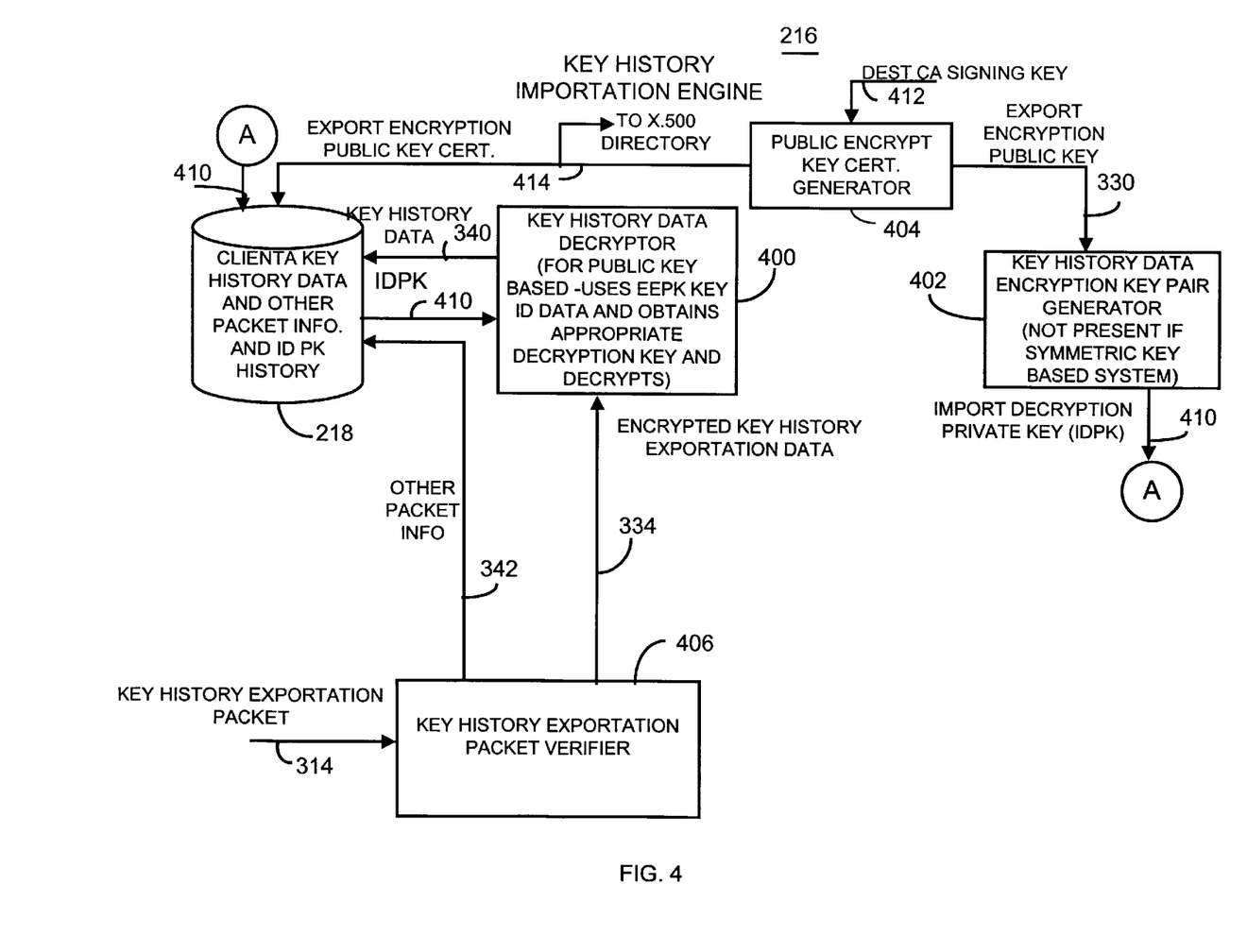
FIG. 4 is a block diagram illustrating one example of a key history importation engine in accordance with one embodiment of the invention.

FIG. 4 illustrates a block diagram of one example of a private key history importation engine 216 having a key history data decryptor 400, a key history data encryption key pair generator 402, a public encryption key certificate generator 404 and a key history exportation packet verifier 406.

The key history importation engine 216 uses the encryption key pair generator 402 to generate a key history data encryption key pair that includes an export encryption public key (EEPK) 330 that is included in an export encryption public key certificate 414, and an import decryption private key (IDPK) 410, which is stored in the storage unit 218. The key history exportation engine (FIG. 3) encrypts the key history data using the export encryption public key 330. The import decryption private key 410 is used by the key history data decryptor 400 in the key history importation engine 216 to decrypt encrypted key history data 334. The public encryption key certificate generator 404 uses the target or destination trust authority's signing key 412 to generate the export encryption public key certificate 414. The export encryption public key certificate 414 includes the export encryption public key 330. Hence, the exportation encryption public key certificate 414 is stored locally by the importation engine (which would be in the destination trust authority when a key history is imported) and may also be stored in a public storage location such as an X.500 type directory, other storage indexed by a Uniform Resource Identifier (URL), IP address, or any other storage or other techniques as known in the art, for retrieval by an exportation engine.

The export encryption public key provider 308 in FIG. 3 obtains the export encryption public key certificate 414 to obtain the export encryption public key 330. The key history data encryptor uses the export encryption public key 330 to encrypt the symmetric key 326 used to encrypt the key history data.

When a subscriber is transferred from one trust anchor to another trust anchor (from one trust authority to another trust authority) and wishes to have the key history data also transferred, the destination trust authority generates the export encryption key pair so that the exporting trust authority can encrypt the key history data 340. The destination certification authority, uses its key history importation engine to decrypt the key history exportation packet 314 after it has been generated by the key history exportation engine. The key history exportation packet verifier 406 obtains the importation verification public key certificate 322 from the key history exportation packet and verifies the importation verification public key certificate. If verification is confirmed, a key history exportation packet verifier 406 uses the importation verification public key 318 from the certificate to verify the signature on the packet. If the signature on the key history exportation packet verifies, indicating that packet came from the originating trust authority, the encrypted key history exportation data 334 and the other packet data 342 is obtained from the packet.

The key history data decryptor 400 receives the encrypted key history exportation data 334 and uses the exportation encryption public key identification data and obtains the appropriate corresponding decryption key, namely the import decryption private key 410 and decrypts the encrypted key history exportation data to obtain the key history data 340. The key history data 340 is then stored in an encrypted form, if desired, such as encrypted under a symmetric key used by the importing CA for the purpose of encrypting data that is permanently stored, then stored in storage medium 218 for later request and retrieval by the subscriber. The key history data decryptor 400 obtains the import decryption private key 410 from the storage unit 218 based on the EEPK key ID data.

In summary, the destination trust authority generates the encryption key pair for key history transfer. The encryption key pair includes an exportation encryption public key signed by the destination trust authority and issued in the form of a certificate, and also generates the import decryption private key which is later used to decrypt the encrypted key history exportation data received from the trust authority that is exporting the key history data.

Figure 5:
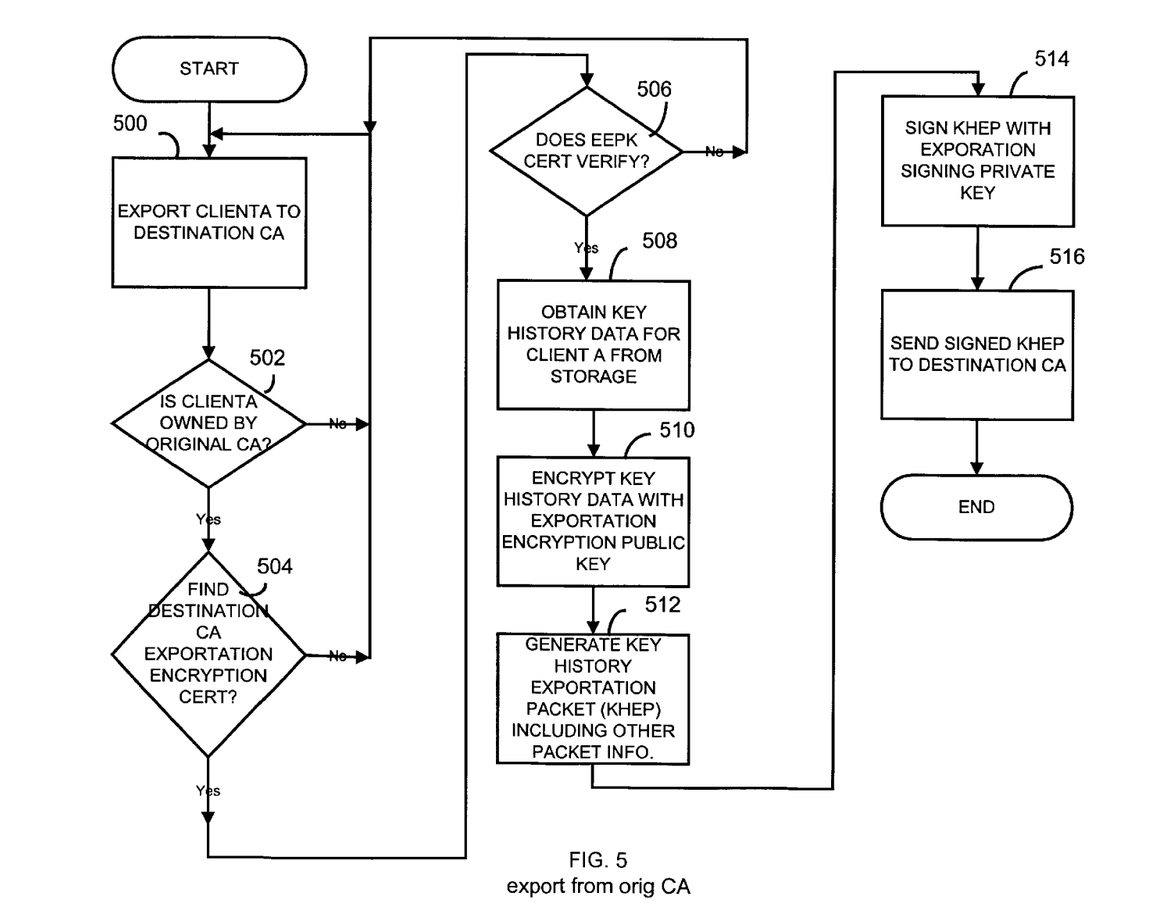
FIG. 5 is a flow chart illustrating the steps in exporting key history data from the originating trust authority in accordance with one embodiment of the invention.

FIG. 5 illustrates a flow chart indicating one example a trust authority exporting encryption key history data to another trust authority or destination trust authority. As shown in block 500, the originating trust authority receives a request to export subscriber A to a destination trust authority. As shown in block 502, the originating trust authority determines if the subscriber to be exported is "owned" by the originating trust authority, indicating that the trust authority requested for the transfer serves as the trust anchor for the subscriber. This is done by the exporting trust authority checking its database for subscriber A and checking that subscriber A is still active (i.e., subscriber A has not already been exported. If the trust authority being requested to export the client is not the trust anchor, the trust authority waits for another exportation request. However, as shown in block 504, if the trust authority being asked to export the key history data is the subscriber's trust anchor, the trust authority finds the destination trust authority exportation encryption certificate in a suitable directory. Alternatively, the destination trust authority exportation encryption certificate can also be manually passed (by using for example a data file) by the importing CA to the exporting CA if there is no directory available. The trust authority locates the certificate based on destination trust authority identification data indicated in the exportation request. If the originating trust authority does not find the exportation encryption certificate for the destination trust authority, the originating trust authority again waits for a subscriber exportation request. If, however, the originating trust authority finds an appropriate export encryption public key certificate, namely the destination trust authority's encryption public key certificate, the exportation encryption public key provider performs signature verification to see whether the exportation public key certificate verifies as shown in block 506. If the export encryption public key certificate verifies indicating that a key history data encryption key pair has been generated by a proper authority, the private key history exportation engine obtains the key history data for the subscriber from local storage as shown in block 508. The private key history exportation packet generator then encrypts the key history data with the exportation encryption public key as shown in block 510. For example, the exportation encryption public key encrypts the symmetric key and the symmetric key is used to encrypt the key history data. As shown in block 512, the private key history exportation packet generator then generates the key history exportation packet which includes other packet information as previously noted. As shown in block 514, the private key history exportation packet generator digitally signs the key history exportation packet with the exportation signing private key. As shown in block 516, the key history exportation packet as signed is sent to the destination trust authority.

Figure 6:
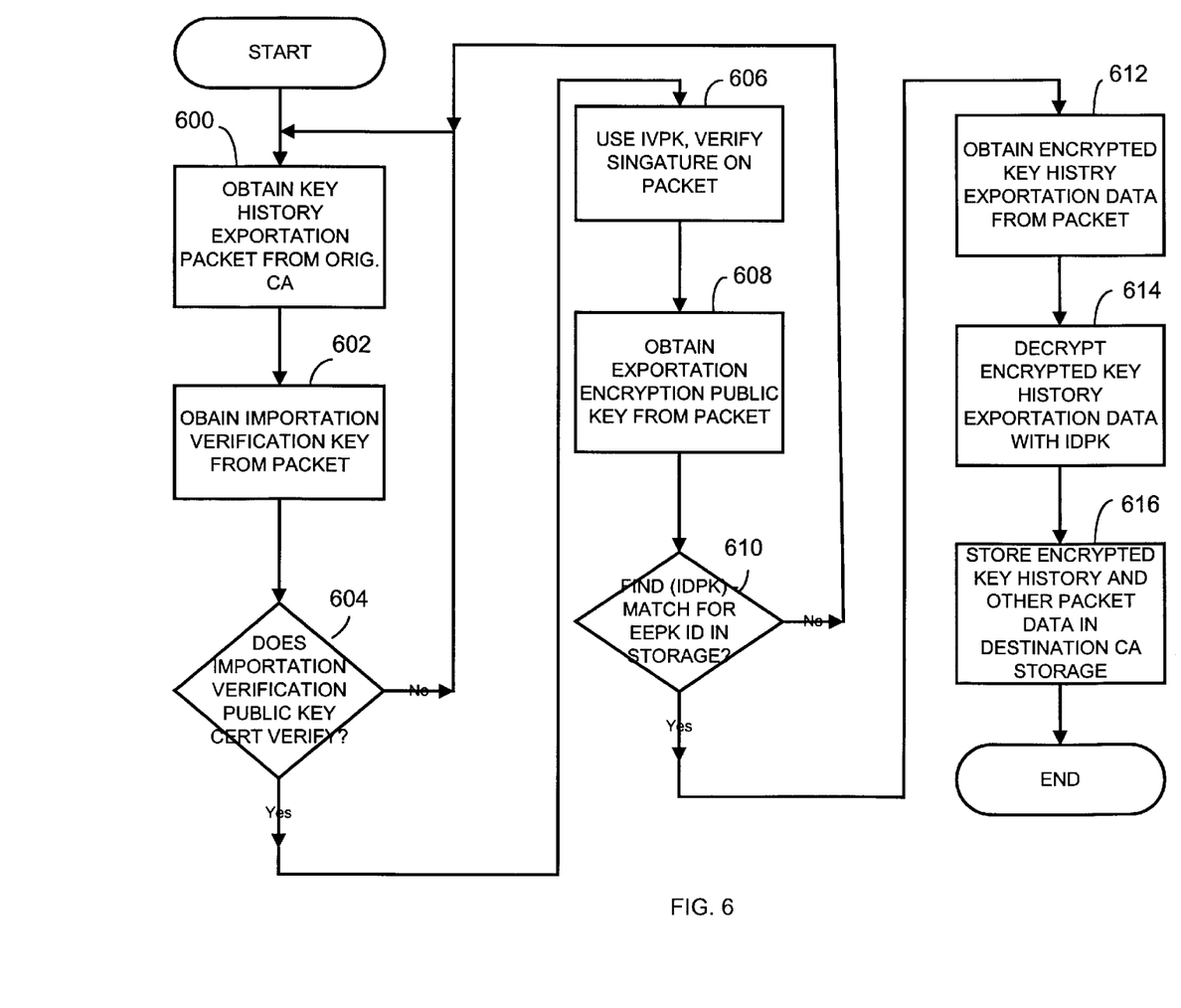
FIG. 6 is a block diagram illustrating steps for importing key history data in accordance with one embodiment of the invention.

FIG. 6 illustrates an example of a method for obtaining exported private key history data. As shown in block 600, the destination authority, through its key history importation engine, obtains the key history exportation packet from the originating trust authority. As shown in block 602, the key history importation engine obtains the importation verification public key certificate from the key history exportation packet. The key history importation engine then determines whether the importation verification public key certificate verifies as shown in block 604. If the certificate cannot be verified, the key history importation engine then tries to obtain another key history exportation packet. If, however, the importation verification public key certificate verifies, the key history importation engine uses the importation verification public key retrieved from the importation verification public key certificate to verify the signature on the packet as shown on block 606. The importation engine then obtains the export encryption public key identification data as shown in block 608. Using the export encryption public key identification data in the packet, the importation engine then finds a match for the importation decryption private key in storage as shown in block 610. If no match is found, the importation engine then waits for a new key history exportation packet. However, if a match is found, as shown in block 612, the key history importation engine obtains encrypted key history exportation data from the packet and decrypts the encrypted key history exportation data using the importation decryption private key as shown in block 614. In other words, to decrypt the encrypted key history, the importation engine first decrypts the random symmetric key included in the key exportation packet and then uses the decrypted symmetric key to decrypt the encrypted key history. The key history importation engine as shown in block 616 then stores the encrypted key history and other packet data in the destination trust authority storage unit 218.

As such, the disclosed system allows a subscriber to be transferred to a new trust anchor which stores a plurality of previously used decryption keys and the identifiers for the decryption keys, such as private decryption keys, so that older e-mails or other information may be decrypted after a key has been revoked or otherwise rendered non-usable. If desired, each trust authority in a multi-trust authority system may bulk export and/or bulk import key history data for a plurality of subscribers from a plurality of trust authorities. Each trust authority may include importation and exportation engines so that they may act to either transfer subscribers or receive subscribers.

In an alternative embodiment, the system may be used to a non-public key based system such that symmetric keys are used as the encryption keys. For example, in such a system, encryption keys may be password-based and key history data encryption key pair generators are rendered unnecessary. Instead, a suitable symmetric key may be generated and used by both the key history importation engine and key history exportation engine. In such a system there may be two password based symmetric keys generated; one for encryption and one integrity. For integrity a MAC (message authentication code) may be used instead of a digital signature. The key history exportation engine may include therefore a symmetric key generator operative to generate a key history data encryption key. In such a system, the key history importation engine includes a symmetric decryption key generator operative to generate a symmetric decryption key to decrypt encrypted key history data.

The aforedescribed exportation and importation engines, including, for example, encryptors, verifiers and key pair generators may be suitably implemented by software that controls one or more processing units to perform the necessary operations as described herein. Alternatively, a combination of hardware and software components may be used to carry out the disclosed system and methods. Where the importation engine and exportation engines are software modules, the software may be stored in any suitable storage medium, including CD ROMs, optical storage mediums, magnetic storage mediums, or any other suitable medium. As such, the software may be executable code that may be understood by one or more processing units with the processing units carrying out the aforedescribed operations.

Also, the transfer of the key history packet may go directly from an original server to a destination server (trust authority) or alternatively, back to the subscriber and then to the destination trust authority. Preferably, although not required, a separate public/private key pair for each of encryption and digital signatures can be used. Thus utilizing a two key pair approach. However, a single key pair, such as RSA or elliptic curve systems as known in the art may also be used. In addition, although a subscriber may move from one trust authority to another trust authority with a trust link set up between the two trust authorities, a subscriber may also be moved to a trust authority where trust has not been set up (non-cross certified and not in a strict heirarchy). However, key recovery is typically required to complete an operation such as this. In addition, a trust authority may maintain a data base containing the key history data or a separate service, third party or other data base may also be used if desired. In addition, the plurality of private decryption keys or other cryptographic keys for which a history is desired, may be individually encrypted using a symmetric key or encrypted in groups using the same symmetric key for each group, if desired. In addition, the system may perform bulk transfers of subscribers from one trust authority to another by carrying out the operation for a large number of subscribers at the same time. Moreover, an originating authority effectively pushes key histories, containing multiple decryption keys for example, to a destination authority that stores key histories for a plurality of users.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An information security subscriber trust authority transfer system comprising:
   at least a first trusted authority having a security key history exportation engine operative to generate a security key history exportation packet containing at least encrypted security key history data uniquely associated with a subscriber; and
   at least a second trusted authority having a security key history importation engine operative to decrypt the security key history exportation packet and store retrieved security key history data for later access by the subscriber.

2. the system of claim 1 wherein at least the second trusted authority serves as a trusted certification authority for the subscriber instead of the at least first trusted authority and provides old encryption keys from the imported key history data to the subscriber in response to a request from the subscriber.

3. The system of claim 1 wherein the security key exportation engine generates an exportation signing key pair including at least a key history export private signing key and a key history import public verification key.

4. The system of claim 1 wherein the security key exportation engine generates an exportation symmetric encryption key.

5. The system of claim 1 wherein the security key importation engine includes an encryption key pair generator for key history transfer wherein the encryption key pair includes at least an export encryption public key and an import decryption private key and wherein the export encryption public key is used by the key history exportation engine to encrypt key history data and wherein the import decryption private key is used by the key history importation engine to decrypt encrypted key history data.

6. The system of claim 1 wherein the security key exportation packet includes the security key history data that includes a plurality of subscriber private decryption keys that are encrypted using a symmetric exportation encryption key (Ks1) and wherein the key (Ks1) is encrypted using an export encryption public key (Keepk) associated with the second trust authority to form encrypted key history data.

7. The system of claim 6 wherein the security key exportation engine also includes:
   a key history data signing key pair generator that generates an export signing public key (ESPK) and a key history export signing private key (KHSPK); and
   a key history data signor operative to digitally sign the encrypted key history data using at least the export private signing key generated.

8. The system of claim 1 wherein the security key history data includes a plurality of private decryption keys associated with prior used public/private encryption key pairs for the subscriber.

9. The system of claim 1 wherein the key history exportation engine includes a symmetric key generator operative to generate a key history data encryption key and wherein the key history importation engine includes a symmetric decryption key generator operative to generate a symmetric decryption key to decrypt encrypted key history data.

10. The system of claim 5 wherein the key history importation engine imports private key history data and includes:
    a key history exportation packet verifier operative to receive the key history exportation packet and to verify a digital signature associated with the key history exportation packet, using an exportation public key certificate; and
    a key history data decryptor operatively coupled to receive encrypted key history data contained in the key history data packet by retrieving, from a storage medium, an import decryption private key based on export encryption public key identification data contained in the packet and decrypting encrypted key history data using the import decryption private key.

11. The system of claim 1 wherein the subscriber stores data representing that the second trust authority is a new originating trust authority in response to transfer of the security key exportation packet to the second trust authority.

12. An information security subscriber trust authority transfer method comprising:
    at least a first trusted authority having a first security key history exportation engine operative to generate a first security key history exportation packet containing at least encrypted security key history data uniquely associated with a first subscriber and further having a first security key history importation engine operative to decrypt a received first security key history exportation packet and store retrieved security key history data for later access by a second subscriber; and
    at least a second trusted authority having a second security key history importation engine operative to decrypt the first security key history exportation packet generated by the first trusted authority and to store retrieved security key history data for later access by the first subscriber, and further having a second security key history exportation engine operative to generate a second security key history exportation packet containing at least encrypted security key history data uniquely associated with the second subscriber.

13. The system of claim 12 wherein the at least second trusted authority serves as a trusted certification authority for the first subscriber instead of the at least first trusted authority and provides an old encryption key from the imported key history data to the first subscriber in response to a request from the first subscriber.

14. The system of claim 12 wherein each of the first and second security key exportation engines generates an exportation signing key pair including at least a key history export private signing key and a key history import public verification key.

15. The system of claim 12 wherein each of the first and second security key exportation engines generates an exportation symmetric encryption key.

16. The system of claim 12 wherein each of the first and second security key importation engines includes an encryption key pair generator for key history transfer wherein the encryption key pair includes at least an export encryption public key and an import decryption private key and wherein the export encryption public key is used by a respective key history exportation engine to encrypt key history data and wherein the import decryption key is used by a respective key history importation engine to decrypt encrypted key history data.

17. The system of claim 12 wherein the first security key exportation packet includes the security key history data uniquely associated with the first subscriber that includes a plurality of subscriber private decryption keys that are encrypted using a symmetric exportation encryption key (Ks1) and wherein the key (Ks1) is encrypted using an export encryption public key (Keepk) associated with the second trust authority to form encrypted key history data.

18. The system of claim 17 wherein each of the first and second security key exportation engines also includes:
   a key history data signing key pair generator that generates an export signing public key (ESPK) and a key history export signing private key (KHSPK); and
   a key history data signor operative to digitally sign at least the encrypted key history data using the export private signing key generated.

19. The system of claim 12 wherein the first security key history data includes a plurality of private decryption keys associated with prior used public/private encryption key pairs for the first subscriber.

20. The system of claim 12 wherein each of the first and second key history exportation engine includes a symmetric key generator operative to generate a key history data encryption key and wherein the first key history importation engine includes a symmetric decryption key generator operative to generate a symmetric decryption key to decrypt encrypted first key history data.

21. The system of claim 16 wherein the first key history importation engine imports private key history data associated with the second subscriber and includes:
   a key history exportation packet verifier operative to receive the second key history exportation packet and to verify a digital signature associated with the second key history exportation packet, using an exportation public key certificate; and
   a key history data decryptor operatively coupled to receive encrypted key history data contained in the second key history exportation packet by retrieving, from a storage medium, an import decryption private key based on export encryption public key identification data contained in the second key history exportation packet and decrypting encrypted key history data using the import decryption private key.

22. The system of claim 12 wherein the subscriber stores data representing that the second trust authority is a new originating trust authority in response to transfer of the security key exportation packet to the second trust authority.

23. An information security subscriber trust authority transfer method comprising:
   generating, by a first certification authority, a security key history exportation packet containing at least encrypted security key history data uniquely associated with a subscriber; and
   decrypting, by a second certification authority, the security key history exportation packet; and
   storing retrieved security key history data for later access by the subscriber.

24. The method of claim 23 wherein the second certification authority serves as a subsequent trusted certification authority for the subscriber instead of the at least first trusted authority and provides an old encryption key from the imported key history data to the subscriber in response to a request from the subscriber.

25. The method of claim 23 including generating, by the first certification authority, an exportation signing key pair including at least a key history export private signing key and a key history import public verification key.

26. The method of claim 23 including, generating, by the first certification authority, an exportation symmetric encryption key.

27. The method of claim 23 including generating, by the second certification authority, an encryption key pair for key history transfer wherein the encryption key pair includes at least an export encryption public key and an import decryption private key and wherein the export encryption public key is used by the second certification authority to encrypt key history data and wherein the import decryption key is used by the second certification authority to decrypt encrypted key history data.

28. The method of claim 23 wherein the security key exportation packet includes the security key history data that includes a plurality of subscriber private decryption keys that are encrypted using a symmetric exportation encryption key (Ks1) and wherein the key (Ks1) is encrypted using an export encryption public key (Keepk) associated with the second certification authority to form encrypted key history data.

29. The method of claim 28 including:
   generating an export signing public key (ESPK) and a key history export signing private key (KHSPK); and
   digitally signing at least the encrypted key history data using the export private signing key generated.

30. The method of claim 23 wherein the security key history data includes a plurality of private decryption keys associated with prior used public/private encryption key pairs for the subscriber.

31. The method of claim 23 including generating a key history data encryption key and generating, using a symmetric decryption key generator, a symmetric decryption key to decrypt encrypted key history data.

32. The method of claim 27 including:
   receiving the key history exportation packet;
   verifying a digital signature associated with the key history exportation packet, using an exportation public key certificate; and
   decrypting encrypted key history data contained in the key history data packet by retrieving, from a storage medium, an import decryption private key based on export encryption public key identification data contained in the packet and decrypting encrypted key history data using the import decryption private key.

33. The method of claim 23 including storing, by the subscriber, data representing that the second trust authority is a new originating trust authority in response to transfer of the security key exportation packet to the second trust authority.

34. A storage medium comprising:
memory containing executable program instructions that when read by one or more processing units, causes one or more processing units to:
generate a security key history exportation packet containing at least encrypted security key history data uniquely associated with a subscriber;
decrypt the security key history exportation packet; and
store retrieved security key history data for later access by a security information system subscriber.

35. The storage medium of claim 34 including memory containing executable program instructions that when read by one or more processing units, causes one or more processing units to serve as a subsequent trusted certification authority for the subscriber instead of an at least first trusted authority and provides an old encryption key from the imported key history data to the subscriber in response to a request from the subscriber.

36. The storage medium of claim 34 including memory containing executable program instructions that when read by one or more processing units, causes one or more processing units to generate an exportation signing key pair including at least a key history export private signing key and a key history import public verification key.

37. The storage medium of claim 34 including memory containing executable program instructions that when read by one or more processing units, causes one or more processing units to generate an encryption key pair for key history transfer wherein the encryption key pair includes at least an export encryption public key and an import decryption private key and wherein the export encryption public key is used by another processing unit to encrypt key history data and wherein the import decryption key is used by the second certification authority to decrypt encrypted key history data.

38. The storage medium of claim 37 wherein the security key exportation packet includes the security key history data that includes a plurality of subscriber private decryption keys that are encrypted using a symmetric exportation encryption key (Ks1) and wherein the key (Ks1) is encrypted using an export encryption public key (Keepk) associated with the second certification authority to form encrypted key history data.

39. The storage medium of claim 38 including memory containing executable program instructions that when read by one or more processing units, causes one or more processing units to:
generate an export signing public key (ESPK) and a key history export signing private key (KHSPK); and
digitally sign at least the encrypted key history data using the export private signing key generated.

40. The storage medium of claim 34 wherein the security key history data includes a plurality of private decryption keys associated with prior used public/private encryption key pairs for the subscriber.

* * * * *